United States Patent
Gibbons

(10) Patent No.: US 10,618,661 B2
(45) Date of Patent: Apr. 14, 2020

(54) ON-BOARD REMOVABLE CONTAINER FOR COOLING CARGO MATERIALS AND EQUIPMENT IN AIRCRAFT

(71) Applicant: Airbus Operations GmbH, Hamburg (DE)

(72) Inventor: Eric Gibbons, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 697 days.

(21) Appl. No.: 15/042,218

(22) Filed: Feb. 12, 2016

(65) Prior Publication Data

US 2016/0244172 A1    Aug. 25, 2016

Related U.S. Application Data

(60) Provisional application No. 62/119,465, filed on Feb. 23, 2015.

(51) Int. Cl.
| | |
|---|---|
| *B64D 9/00* | (2006.01) |
| *B64D 13/06* | (2006.01) |
| *F25B 9/00* | (2006.01) |
| *F25B 19/00* | (2006.01) |
| *F25D 17/06* | (2006.01) |
| *F25D 3/06* | (2006.01) |
| *F25D 3/08* | (2006.01) |
| *B60H 1/32* | (2006.01) |

(52) U.S. Cl.
CPC .............. *B64D 13/06* (2013.01); *B64D 9/00* (2013.01); *B64D 2013/0614* (2013.01)

(58) Field of Classification Search
CPC .. B64D 9/00; B64D 13/06; B64D 2013/0614; F25B 9/006; F25B 19/00; F25B 19/005; F25D 17/06; F25D 3/10; F25D 3/102; F25D 3/105; F25D 11/003; F25D 3/06; F25D 3/08; B60H 1/32
See application file for complete search history.

(56) References Cited

U.S. PATENT DOCUMENTS

| | | | | |
|---|---|---|---|---|
| 3,093,348 | A * | 6/1963 | Schelp | B64C 30/00 244/15 |
| 5,337,579 | A * | 8/1994 | Saia, III | B60H 1/3226 62/239 |
| 9,019,719 | B2 | 4/2015 | Tomasi et al. | |
| 9,162,770 | B2 | 10/2015 | Stückl et al. | |

(Continued)

FOREIGN PATENT DOCUMENTS

| | | |
|---|---|---|
| DE | 102011105880 B4 | 5/2014 |
| FR | 2980459 A1 | 9/2011 |

*Primary Examiner* — Frantz F Jules
*Assistant Examiner* — Erik Mendoza-Wilkenfel
(74) *Attorney, Agent, or Firm* — Greer, Burns & Crain, Ltd.

(57) ABSTRACT

A container designed for carrying payload and being removably installable and dimensioned to fit in a cargo bay of an aircraft. Included in the container is a payload compartment having space defined by the payload compartment for carrying the payload. A heat exchanger is installed within the container to perform heat exchange operation for the payload using a coolant. A heat exchanger control unit controls the heat exchange operation of the heat exchanger between the payload and the heat exchanger using an internal circuitry.

15 Claims, 13 Drawing Sheets

(56) References Cited

U.S. PATENT DOCUMENTS

| | | | |
|---|---|---|---|
| 2004/0077214 A1* | 4/2004 | Turek | H01R 13/743 439/565 |
| 2007/0289976 A1* | 12/2007 | Meyer | F25D 11/003 220/592.09 |
| 2008/0110593 A1* | 5/2008 | Coney | F01D 25/12 165/80.2 |
| 2008/0156028 A1* | 7/2008 | Cur | F25B 25/00 62/203 |
| 2010/0101262 A1* | 4/2010 | Uluc | B64D 13/00 62/407 |
| 2011/0067852 A1* | 3/2011 | Farrar | B65D 88/745 165/263 |
| 2012/0024418 A1* | 2/2012 | French | B64D 37/005 141/1 |
| 2013/0008631 A1* | 1/2013 | Newman | F28D 15/0275 165/104.26 |
| 2013/0077279 A1 | 4/2013 | Tomasi et al. | |
| 2013/0215572 A1 | 8/2013 | Uluc et al. | |
| 2013/0255281 A1* | 10/2013 | Bray | B64D 37/34 62/62 |

* cited by examiner

ON-BOARD REMOVABLE CONTAINER FOR COOLING CARGO MATERIALS AND EQUIPMENT IN AIRCRAFT

CROSS-REFERENCE

This application claims priority of U.S. Provisional Application Ser. No. 62/119,465 filed Feb. 23, 2015 under 35 U.S.C. § 119(e), which is incorporated herein by reference in its entirety.

FIELD OF THE DISCLOSURE

The present disclosure generally relates to containers having cooling systems, and in particular relates to an on-board removable container in an aircraft for cooling power electronics or other cargo materials stored in the container.

BACKGROUND OF THE INVENTION

Conventional aircraft are increasingly relying on an adequate electrical power distribution, including high power loads. Such electrical needs require the use of power electronics, such as power converters or choppers. An exemplary application of the high-power electric components is an electric taxiing system for an aircraft, using electric motors to drive wheels and power electronics to modulate electric signals supplied to the motors.

On airliners, electronic units are commonly installed in a dedicated avionic bay, which is fully equipped with necessary cooling provisions. However, due to a limited size of the avionic bay, and other constraints, such as wire lengths, supplementary power electronics used for the electric taxiing system have to be installed in other locations.

Due to their sensitivity to environmental conditions, such as temperature and humidity, a position within an environmentally-controlled part of a fuselage is mandatory for many of these components. This drastically reduces the available locations in the aircraft, as space within the fuselage is highly valuable. This is especially true for a retrofit aircraft, for which it is difficult to redesign an area to create room.

Referring now to FIGS. 1-3, sensitive elements are typically positioned within a controlled part of the fuselage to minimize a physical footprint, and less sensitive components are separately positioned outside of pressurized space. Various resulting electrical equipment 10 are shown in FIG. 1 and are generally installed in a fuselage 12 of an aircraft 14. One or more pieces of equipment 10 may be disposed near the Main Landing Gear Bay (MLGB) 16 or the Center Wing Box (CWB) 18. The installation of these equipment 10 could be done using common methods for system installation, such as fasteners.

High power electrical equipment 10 generate a relatively large amount of heat power (e.g., approximately 5 kW) inside the controlled part of the fuselage 12. This heat must be extracted to the exterior, for example, via an extraction duct 20 connected to each unit of the electrical equipment 10 and routed towards an outflow valve (not shown). A High Voltage Direct Current (HVDC) input cable 22 and HVDC output cable 24 can be connected to the units of the electrical equipment 10 for delivering power to other components in the aircraft 12, such as electric motors on the landing gear.

However, even though it is simple to install, this solution is not satisfactory due to some major physical drawbacks. For example, cooling fans (not shown) are loud, due to the adverse conditions in which they must operate: large pressure loss in a long duct, small installation volumes, and high air flows. Further, the installation of the duct within the space-constrained fuselage is very difficult and costly, especially in a retrofit aircraft.

Therefore, there is a need for developing an improved packaging having an efficient cooling system that is readily installable and reliable during operation without incurring high maintenance cost.

SUMMARY OF THE INVENTION

Advantages are achieved by the container which includes an improved cooling system for cooling power electronics or other materials disposed in the container. An important aspect of the container is that the container is loaded in the cargo bay of the aircraft, and compatible with the existing cargo hold configurations (e.g., for bulk loading and container loading) and associated cargo-loading assistance systems.

Further, the container provides sufficient volume to hold the desired power electronics or other such payloads requiring cooling. It is contemplated that the container is not limited to power electronics, even if the best mode is a container for cooling the power electronics. Also, the container includes a heat exchanger to cool the payload of power electronics, and to remove heat from the container, using a coolant, such as a dedicated air flow or other fluids available on-board such as fuel, water, oil, and the like.

In the case the coolant is liquid being tapped off an existing aircraft network, such as fuel, the container may include a connector for connecting the containers to a fuel system of the aircraft, for example, via the fuel system of the Auxiliary Power Unit (APU) and has safety devices and a specific method for controlling related devices to ensure safety.

Another advantage is that the container is easily connectable and removable (e.g., a plug and play system) to and from an existing network/circuitry of the aircraft by adding derivations off these networks, with minimal modifications to the aircraft. These connections are for both the cooling fluid flows as discussed above, and also for electrical connections. Also, these connections can be high and low power inputs and outputs, or data connections for control and monitoring purposes. Thus, the container can be installed and removed quickly to enable airlines to only carry its weight and volume as needed.

In one embodiment, a container is designed for carrying payload and is removably installable and dimensioned to fit in a cargo bay of an aircraft. Included in the container is a payload compartment having space defined by the payload compartment for carrying the payload. A heat exchanger is installed within the container to perform heat exchange operation for the payload using a coolant. A heat exchanger control unit controls the heat exchange operation of the heat exchanger between the payload and the heat exchanger using an internal circuitry.

In another embodiment, a container is designed for carrying payload and is removably installable and dimensioned to fit in a cargo bay of an aircraft. Included in the container is a payload compartment having space defined by the payload compartment for carrying the payload. A power electric control unit controls an electric component of the payload via at least one input connection and at least one output connection. A heat exchanger is installed within the container to perform heat exchange operation for the payload using a coolant. A heat exchanger control unit controls the heat exchange operation of the heat exchanger between the payload and the heat exchanger using an internal circuitry.

In yet another embodiment, a container is designed for carrying payload and is removably installable and dimensioned to fit in a cargo bay of an aircraft. Included in the container is a payload compartment having space defined by the payload compartment for carrying the payload. A power electric control unit controls an electric component of the payload via at least one input connection and at least one output connection. A heat exchanger is installed within the container to perform heat exchange operation for the payload using a coolant. A heat exchanger control unit controls the heat exchange operation of the heat exchanger between the payload and the heat exchanger using an internal conduit. The internal conduit is connected at one end to the payload compartment, and an opposite end to the heat exchanger for exchanging heat between the heat exchanger and the payload.

The foregoing and other aspects and features of the disclosure will become apparent to those of reasonable skill in the art from the following detailed description, as considered in conjunction with the accompanying drawings.

DETAILED DESCRIPTION OF THE PREFERRED EMBODIMENTS

Referring now to FIGS. 4-7, an exemplary container 26 of the standard LD3 type, is designed to be removably installed in a cargo bay 28 of the aircraft 14, and compatible with the cargo bay configuration (i.e., exterior aspects of the containers). An airliner cargo hold is meant to carry freight, including for example, passenger bags, boxed goods, or even live animals. The freight can be loaded in bulk, without any particular means to sort items and store them in separate groups depending on final destination or type of goods. Large movements of such bulk cargo is prevented by means of divider nets 30, and heavy items can also be tied down to hard points in the cargo bay 28.

Figure 1:
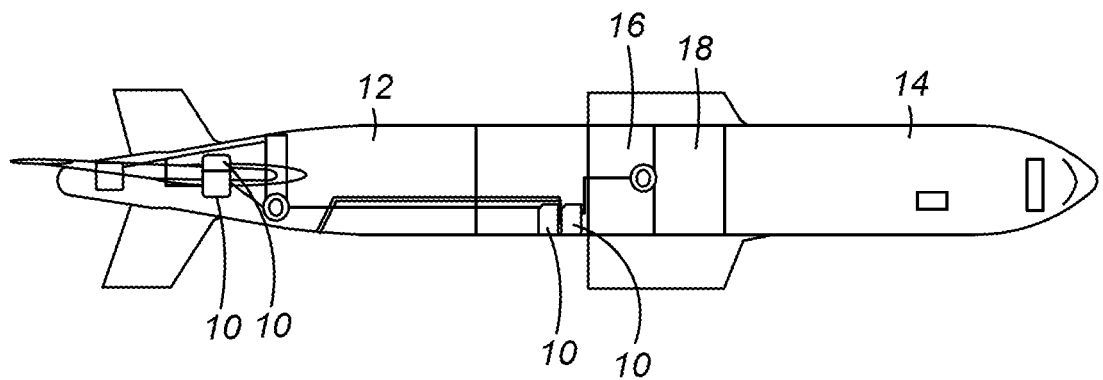
FIGS. 1-3 illustrate exemplary visualizations of conventional electrical equipment, conventionally installed in an aircraft outside of the payload areas (passenger cabin & cargo holds)
Figure 2:
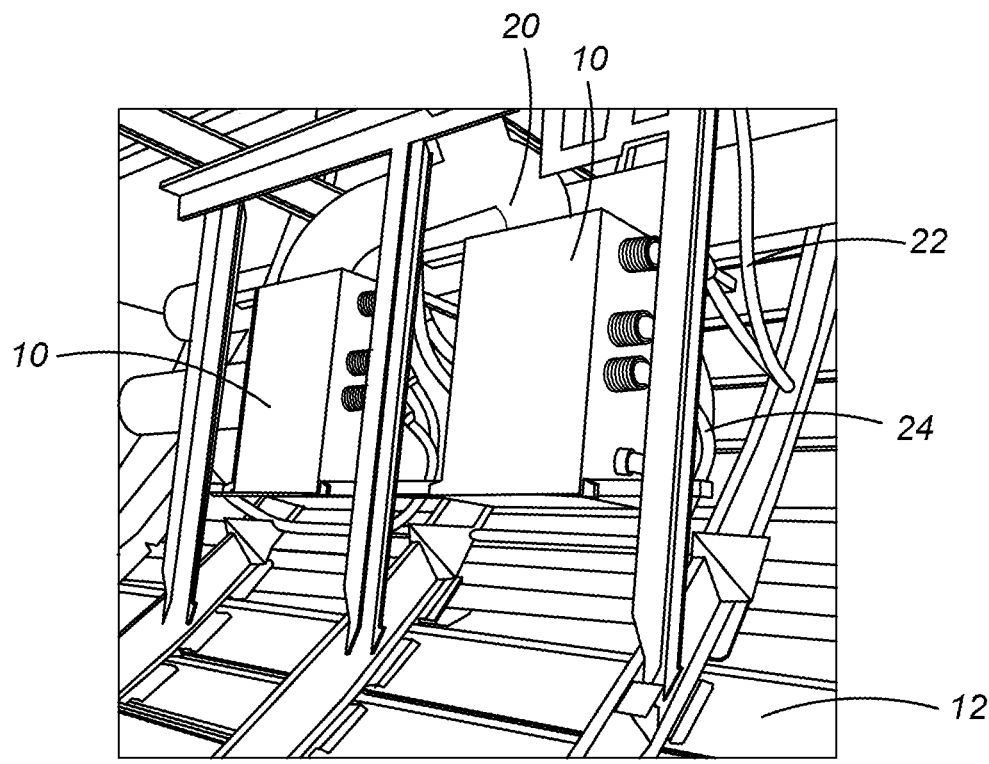
Figure 3:
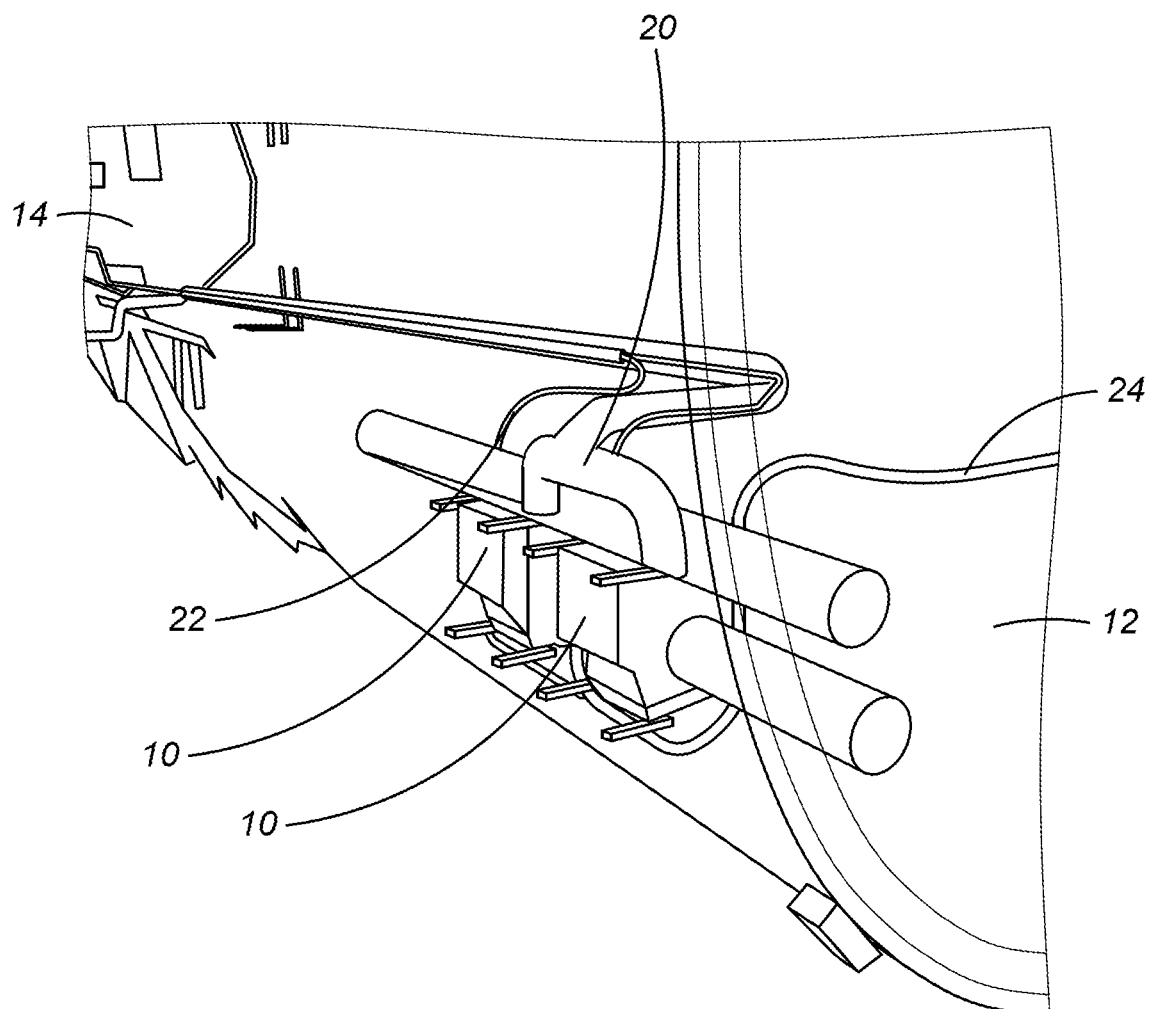
Figure 4:
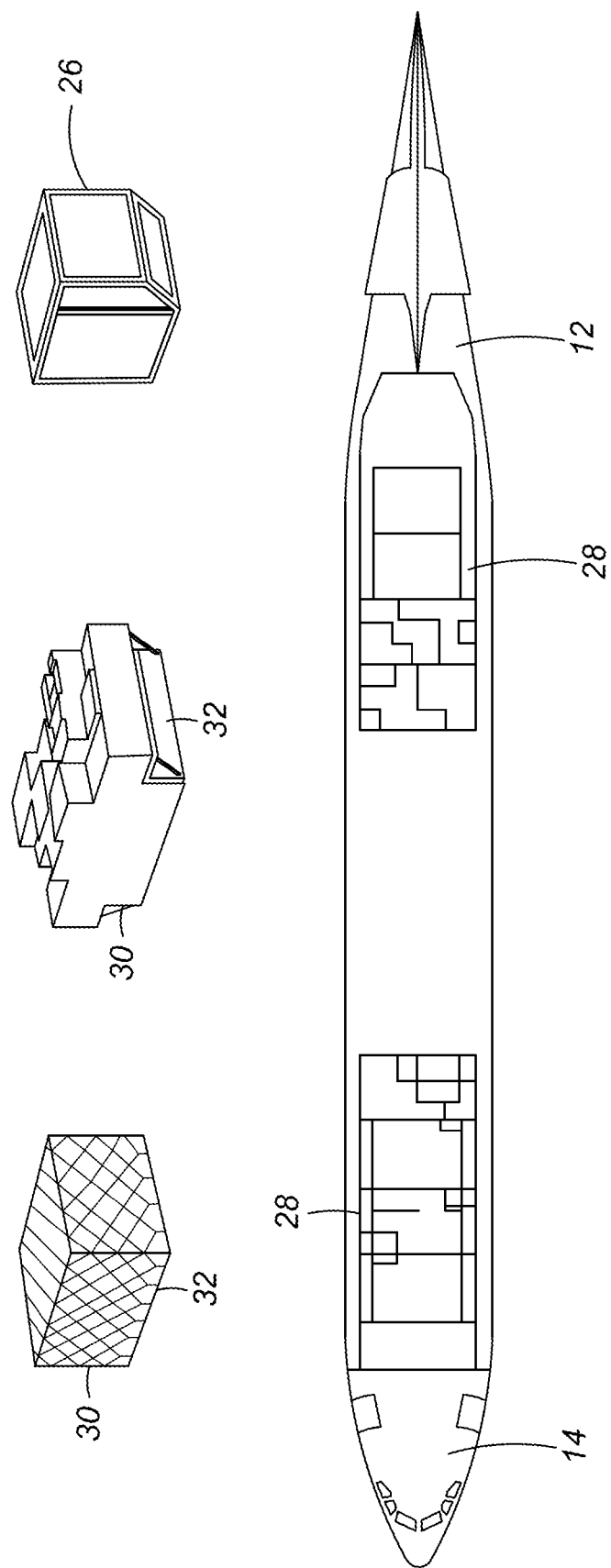
FIG. 4 illustrates an exemplary visualization of conventional cargo containers used in the aircraft.
Figure 5:
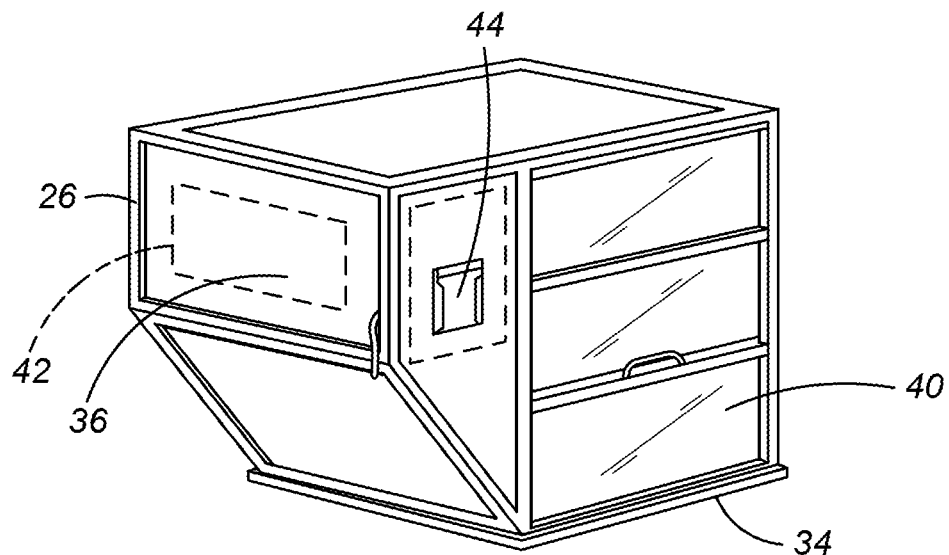
FIG. 5 is a left perspective view of a conventional cargo container having a single wing.

To ease management of the freight, the freight can also be carried inside the container 26 (e.g., fully closed) or on a pallet 32 (e.g., open). An example of a combined load of pallets 32 and containers 26 in the cargo bay 28 is shown in FIG. 4. The containers 26 have standard shapes to allow them to be compatible with a variety of aircraft and cargo-handling equipment. An exemplary shape of the container 26 is shown in FIG. 5. The most critical part of the container 26 is a dimension of a base plate 34 of the container, as the base plate is the interface to various handling equipment in the aircraft 14 or on the ground (not shown). A particular type of the container 26, for example, with a reduced height of 46 inches, is used in the aircraft 14, due to the reduced height of its cargo holds.

Figure 6:
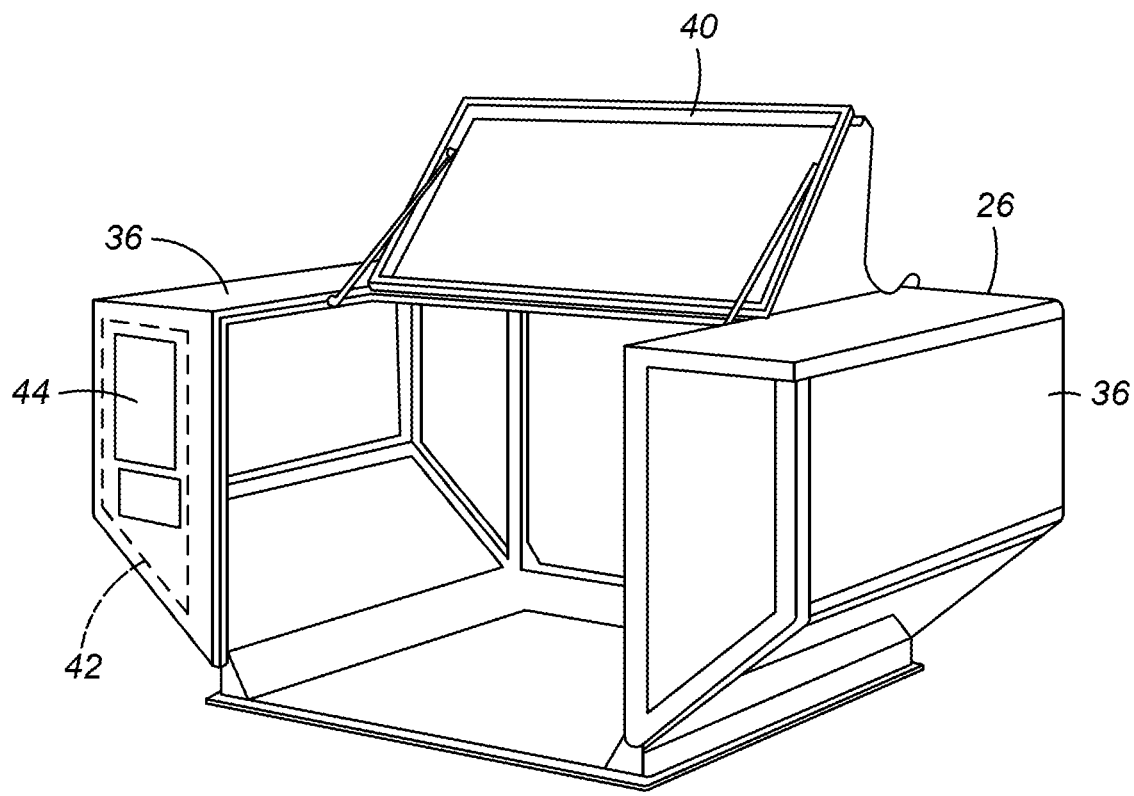
FIG. 6 is a right perspective view of a conventional cargo container having two lateral wings.
Figure 7:
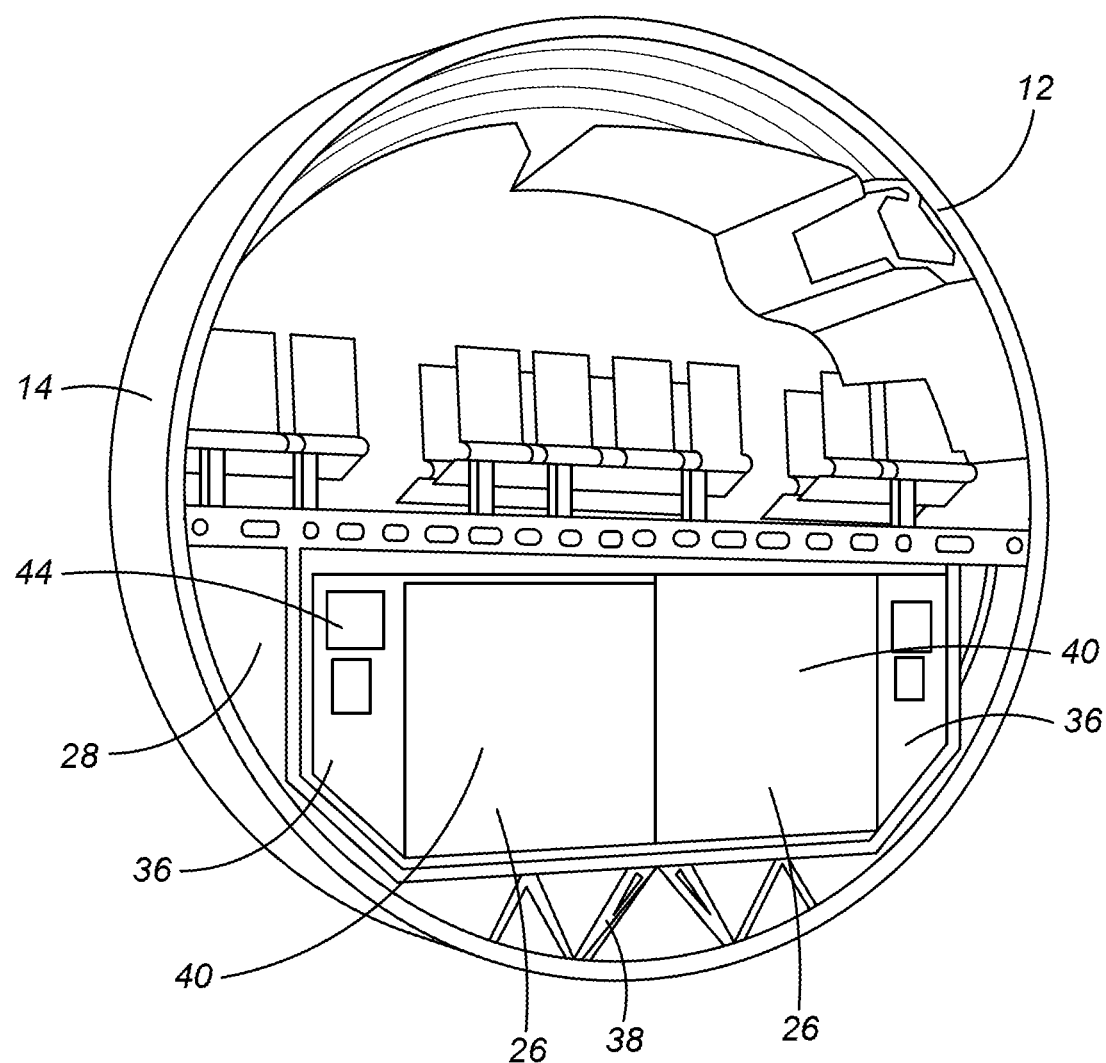
FIG. 7 illustrates an exemplary visualization of the conventional cargo containers inserted in a fuselage of the aircraft.

A substantially trapezoidal shape of some of the containers 26 is due to the need to conform to a generally round cross-sectional shape of the fuselage 12, as illustrated in FIG. 7. The containers 26 can have one or two lateral wings 36, as illustrated in FIGS. 5 and 6. For example, the container may have a left wing, a right wing, or both left and right wings to suit different applications. The container 26 can carry over one ton of payload, and an exact gross weight depends on the specifications and dimensions of each container.

Cargo holds can be loaded by hand, especially when the freight comes in bulk, but can also be optionally equipped with a dedicated loading system (not shown) for assisting the movement of containers and pallets by way of Power Drive Units (PDUs) installed on a floor of the cargo bay 28.

It is preferred that the container 26 is dimensioned to fit within the specifications of the cargo bay 28 to maximize compatibility with the aircraft configurations and handling equipment. For specific applications, such as the electric taxiing system, which may be often installed and/or removed but not at every flight and for which minimizing volume is more important, a specifically smaller contour may be designed for the container 26. However, the container is still compatible with the requirements of the cargo space. A foldable door or flap 40 is provided on an upper or front portion of the container 26 for easy access to the interior of the container, e.g., for loading and unloading purposes.

Referring now to FIGS. 6 and 8-10, in a preferred embodiment, a heat exchange (HX) system or heat exchanger 42 can be installed within one of the wings 36 or elsewhere in the container 26. A control panel 44 having electric cards is also provided on one of the wings 36 or other suitable locations for controlling the HX system or heat exchanger 42. It is contemplated that the container 26 may carry various power electronics (PE) (or any other payload) in a payload compartment 46 requiring cooling and further have various interfaces with networks outside the container for performing data communication or power exchange.

To perform the cooling operation, it is preferred that the container 26 includes the heat exchanger (HX) 42 having an internal circuitry or conduit 48 to exchange heat between the exchanger and the power electronics 46. For example, the internal circuitry or conduit 48 is connected at one end to the payload compartment 46, and an opposite end to the heat exchanger 42 for exchanging heat between the heat exchanger and the payload.

An HX control unit 50 is provided in the container 26 to control the cooling operation and to specify an amount of heat to exchange. It is contemplated that other components, such as a computing unit, one or more temperature sensors, valves, pumps, fans, and the like, are included in the container 26 to perform the cooling operation. Further, external interfaces, such as electric input and output cables or connections 52 are provided for power supply, and coolant intake and output conduits 54 are provided for fluid delivery.

Figure 8:
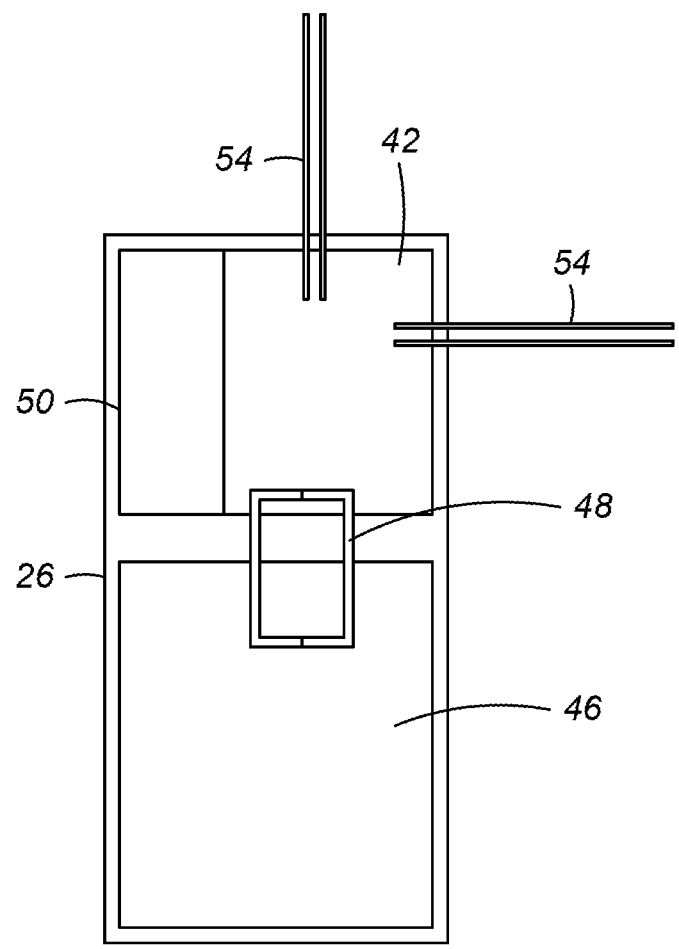
FIG. 8 is a schematic internal view of the container in a first embodiment with a generic payload.
Figure 9:
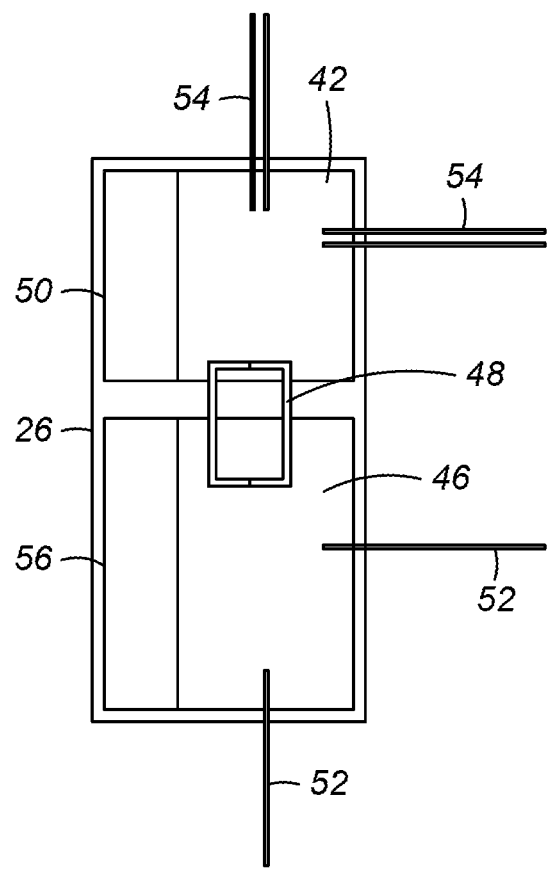
FIG. 9 is a schematic internal view of the container in a second embodiment with a payload of power electronics.

An exemplary generic representation of the container 26 is illustrated in FIGS. 8 and 9. Specifically, an exemplary topological model of the container 26 is shown in FIG. 8, which describes various functions of the container in their approximate physical positions, but the exemplary model is not fully representative of the actual physical product. For example, as shown in FIG. 9, in one embodiment, a separate power electronic control unit 56 is provided to control the power electronics 46 in addition to the HX control unit 50. Other suitable models are also contemplated to suit the application.

An important part of the container 26 is a volume or space provided for the payload 46 that must be both carried and cooled. Depending on the considered application, the container 26 can be designed to be easily opened and closed to retrieve the payload inside the container (e.g., power electronics, or fish), or can be designed to remain closed to protect fragile components in the container, while still allowing some access for maintenance purposes. The latter configuration may be desirable for the electric taxiing systems.

Some applications may require the payload 46 to interface with the aircraft 14, in which case various connections are provided for establishing the interface between the container 26 and the aircraft. As illustrated in FIG. 9, the electric taxiing systems include high power electrical input and output connections 52, as well as dedicated control data connections. Other suitable electrical connections are contemplated to suit different applications. Another important aspect of the container 26 is that the heat exchanger 42 retrieves the heat energy from the payload 46, and removes the heat from the container via aircraft fluid networks using cooling solutions, such as air, fuel, water or other suitable materials.

The performance of the heat exchanger 42 may need to be adapted over time, either because of varying cooling needs, because it must be isolated from the rest of the aircraft 14 for safety purposes, or because of other demands on the cooling fluid. This modulation typically involves various sensors to provide feedback on current conditions (e.g., temperature sensors, smoke detectors, and any other measurements as required) and actuation devices, including a pump or a fan if the fluid is not moved by external means, and valves to isolate the container. The modulation also involves calculation means to control the actuation devices based on feedback measurements from the sensors. In most cases this controller is made of digital electronics with the necessary software to control operations of the related devices.

Figure 10:
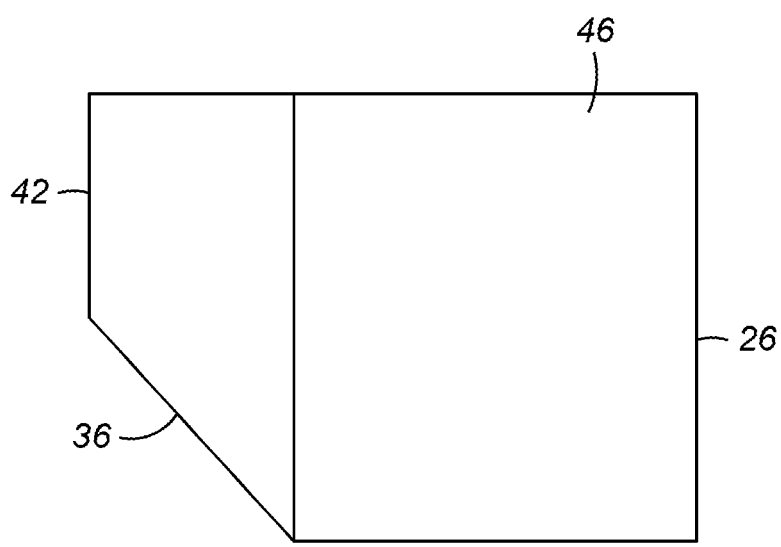
FIG. 10 is a schematic vertical cross-section of the container, featuring a heat exchanger and a control unit.
Figure 11A:
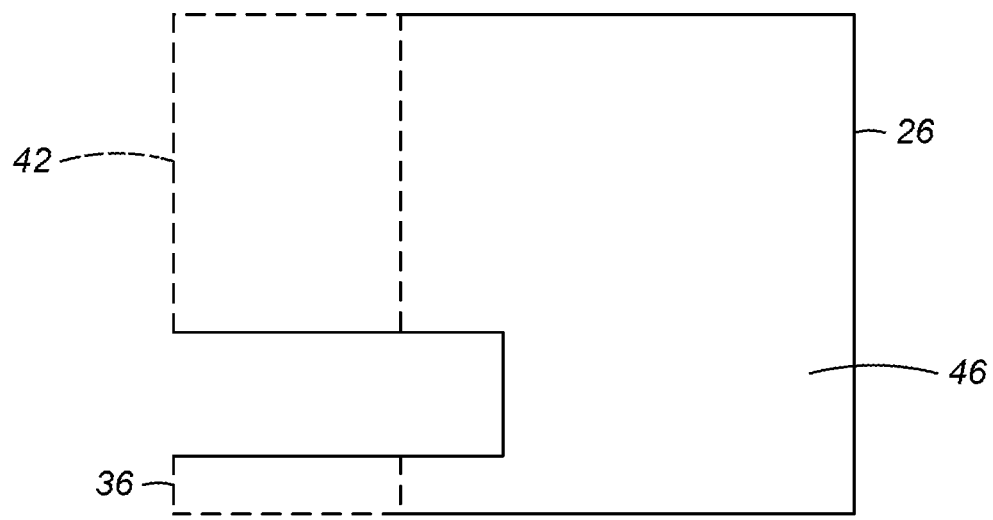
FIGS. 11A and 11B illustrate an exemplary layout of the container, featuring the location of the heat exchanger shown in FIG. 10.
Figure 11B:
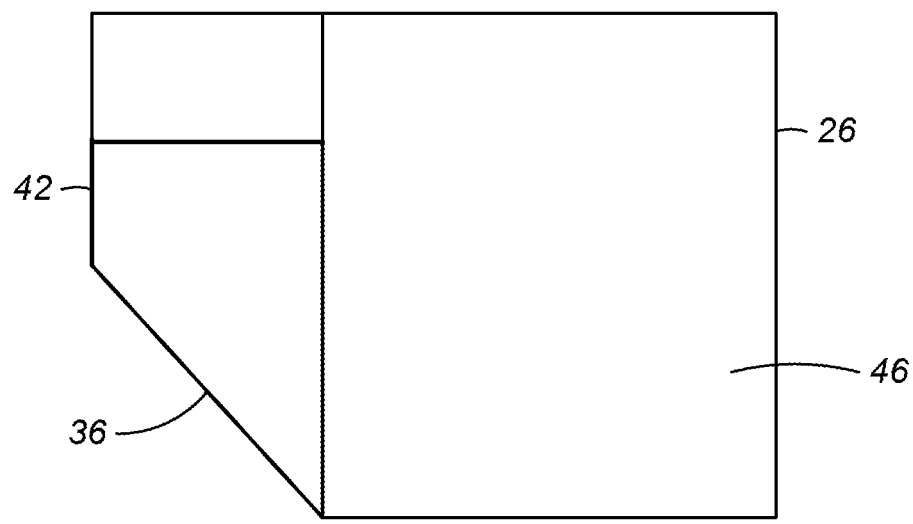

In this latter case, the control electronics exchange data with other aircraft systems (for example, the cockpit warning and display systems). This data exchange is achieved via dedicated data input/output connections, possibly analog or discrete data exchange, or via a data bus using a protocol used for the aircraft 14, such as Controller Area Network (CAN), Aeronautical Radio Incorporated (ARINC) 429 or Avionics Full Duplex Switched Ethernet (AFDX) protocols. A 28 V DC input is included to supply the necessary power to the electronics and sensors. The actuation devices may be powered by either 28 V DC or 115 V AC, and in the second case the necessary power input connection may also be included. An exemplary physical layout of the container 26 is shown in FIG. 10.

Referring now to FIGS. 11-14, the important role of coolant is to carry heat away from the heat source. Therefore, various properties are considered in a coolant, e.g., to be moved easily (i.e., low viscosity), to have good heat exchange characteristics (i.e., thermal conductivity) to easily pick up or drop the heat, which minimizes the heat exchange surface and thus volume and weight, and to have an high specific heat capacity to enable a given amount of energy to be carried by a minimal amount of coolant, thereby reducing the mass flow needs.

The main requirement is to use the fluids that are easily available in the areas of the aircraft 14 immediately around the container 26. More specifically, the most obvious choice of such fluid is simply the air surrounding the container 26 in the cargo bay 28, provided that the fluid can be circulated around to carry the heat out of the cargo bay. However, this depends on the overall aircraft configuration, and may require extensive redesign of the aircraft 14, which is not desired.

Other fluid networks running just outside of the cargo holds include conditioned air, supplied to various parts of a cabin via ducts; water using various pipe lines running to galleys and lavatories in the cabin, or waste water coming back from the galleys and lavatories (additional water lines could be used if fuel cells are used on the aircraft); fuel (e.g., the Auxiliary Power Unit fuel line running along the aft cargo hold towards the aircraft tail section); and hydraulic fluid (e.g., various lines running through the aft fuselage to the actuators of the flight control surfaces in the empennage: elevators, trimmable horizontal stabilizer, rudder).

All of these fluids are adequate means for the heat transfer as per the conditions given in [0041], and all are suitable for the container 26. Water, hydraulic and conditioned air networks fulfill specific functions on board aircraft 14, and therefore interacting them could require potential design issues if not carried out properly.

In a preferred embodiment, the container 26 uses fuel as its coolant. Fuel is an adequate coolant for the heat transfer due to a relatively favorable specific heat capacity (2 kJ/(kg K), compared to 1 kJ/(kg K) for air and 4.2 kJ/(kg K) for water, which are both good heat carriers). While flowing inside a pipe, flammability risks are much reduced compared to fuel vapors in an empty tank. Also, the fuel is stored in large quantities, which provides a large heat storage capability. This is important for applications which are used on ground, when ambient conditions are relatively unfavorable for heat exchange with the environment. This is true for the electric taxiing systems. Once in flight at high altitudes, the fuel is also exposed to the surrounding cold air over a large surface, as it is distributed within the wings of the aircraft 14, thereby making the fuel an appropriate heat exchanger.

Figure 12:
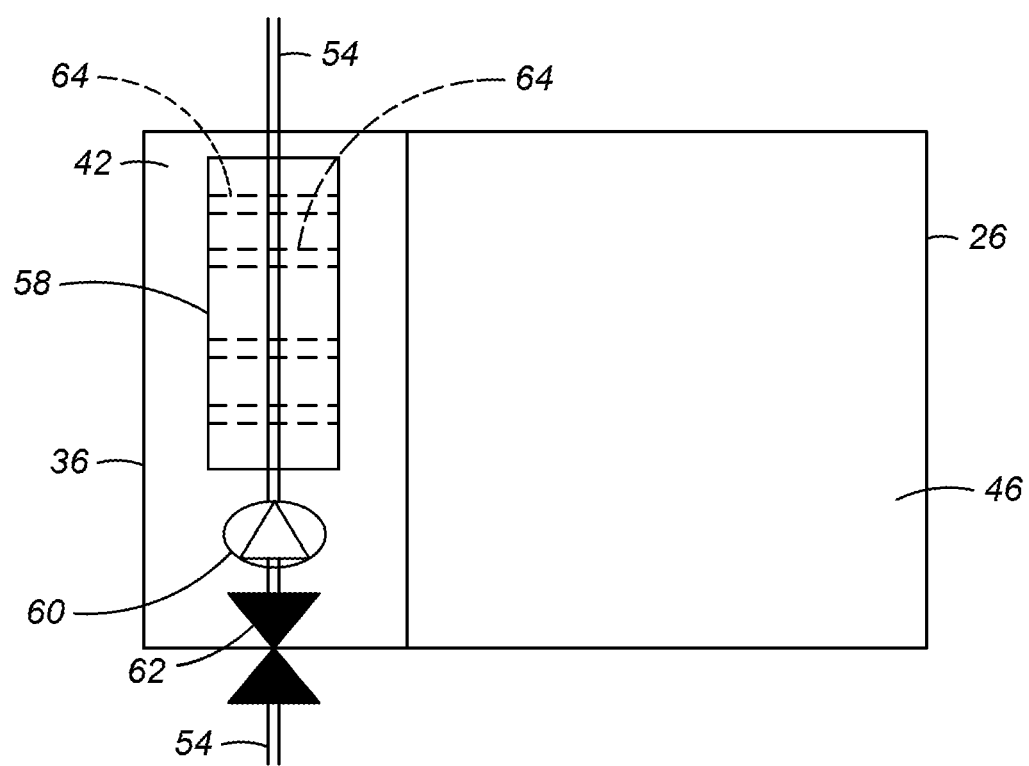
FIG. 12 is a plan horizontal cross-section of the container, featuring a heat exchanger unit, a pump, and a valve.

Details of an exemplary internal heat loop circuitry of the heat exchanger 42 are illustrated in FIGS. 9 and 10. Specifically, the heat exchanger 42 occupies at least one of the wings 36 of the container 26, along with the control electronics, such as the HX control unit 50 and the power electronic control unit 56. As shown in FIGS. 9 and 12, fuel pipes 54 are connected to the aircraft fuel systems, and the heat exchanger 42 includes an HX unit 58 for providing heat exchanges or perform heat exchange operations, a pump 60 is provided for assisting other aircraft pumps in creating or generating a required fuel flow in the container 26, and an input valve 62 for shutting off the fuel flow in the container.

In operation, heat would be transferred into the fuel by means of at least one conductive cold plate 64, taking the heat out of the power electronics 46. It is preferred that the exchanger 42 is designed to be air tight, so as not to leak any fuel or vapor. In other words, the exchanger 42 is enclosed in an air-tight compartment to prevent vapors from egressing, and sparks from reaching the fuel. A cold plate principle is used to extract the heat from the power electronics 46 and carry it to the fuel heat exchanger 42 for reducing complexity and operational costs. For example, the power electronics 46 would be attached onto the conductive plate(s) 64, which reach into the fuel heat exchanger 42.

Figure 13A:
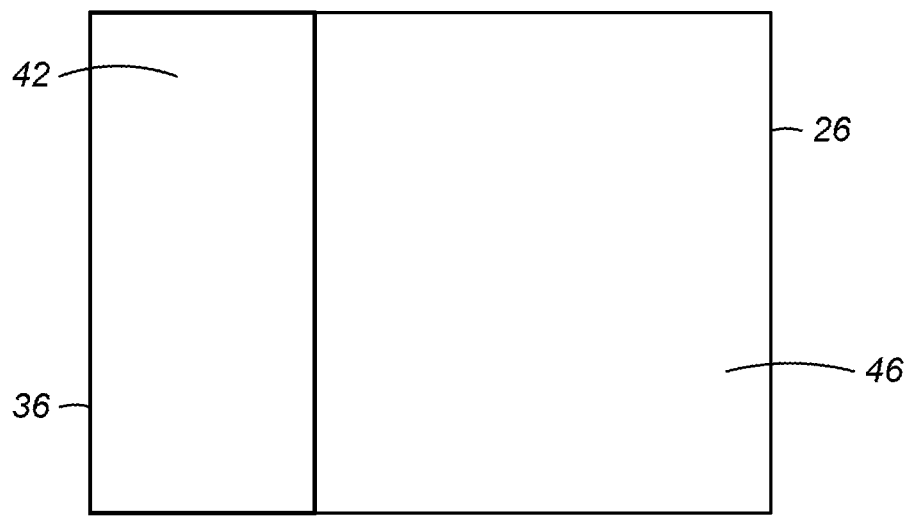
FIGS. 13A and 13B illustrate an exemplary layout of the container featuring the location of the control unit shown in FIG. 10.
Figure 13B:
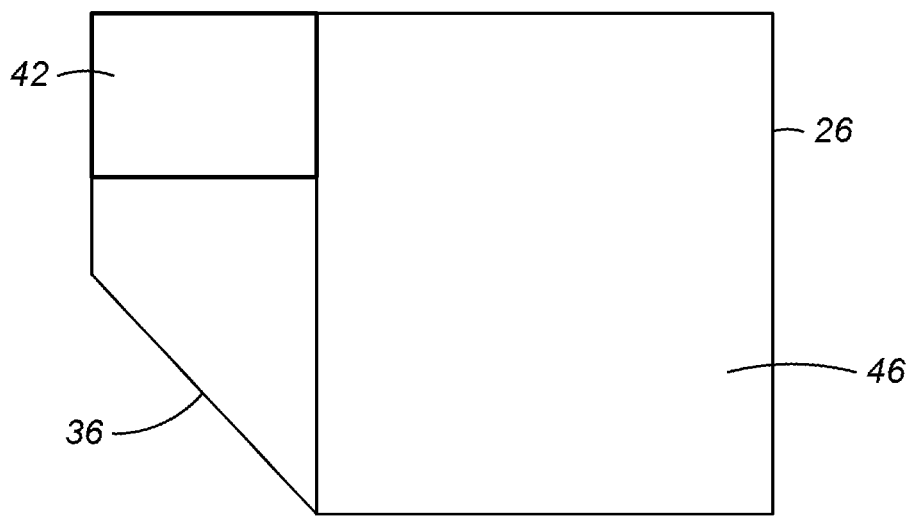
Figure 14A:
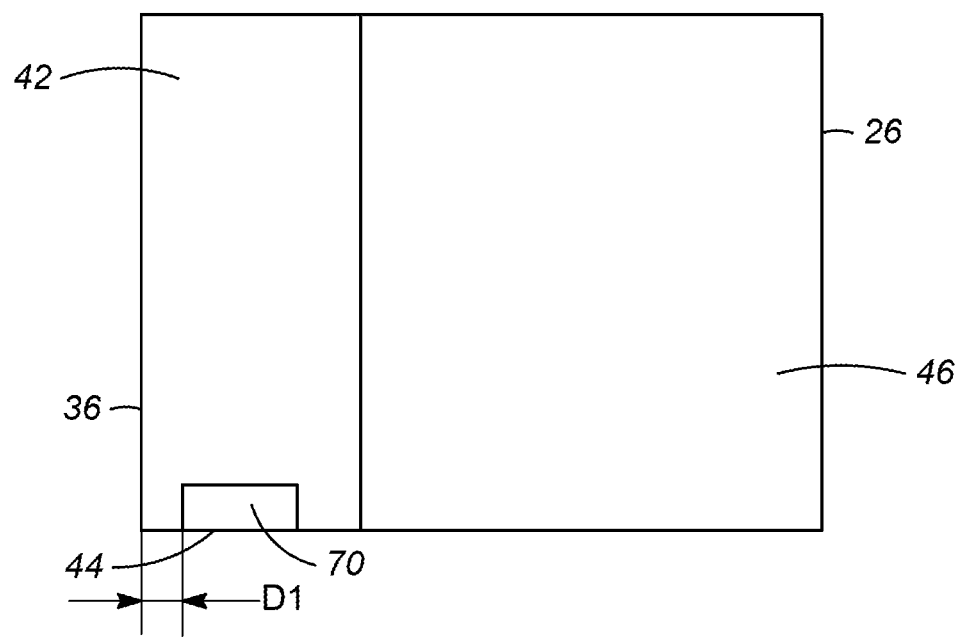
FIGS. 14A and 14B illustrate an exemplary disposition of an electrical connection panel of the container having multiple connectors for data and power.
Figure 14B:
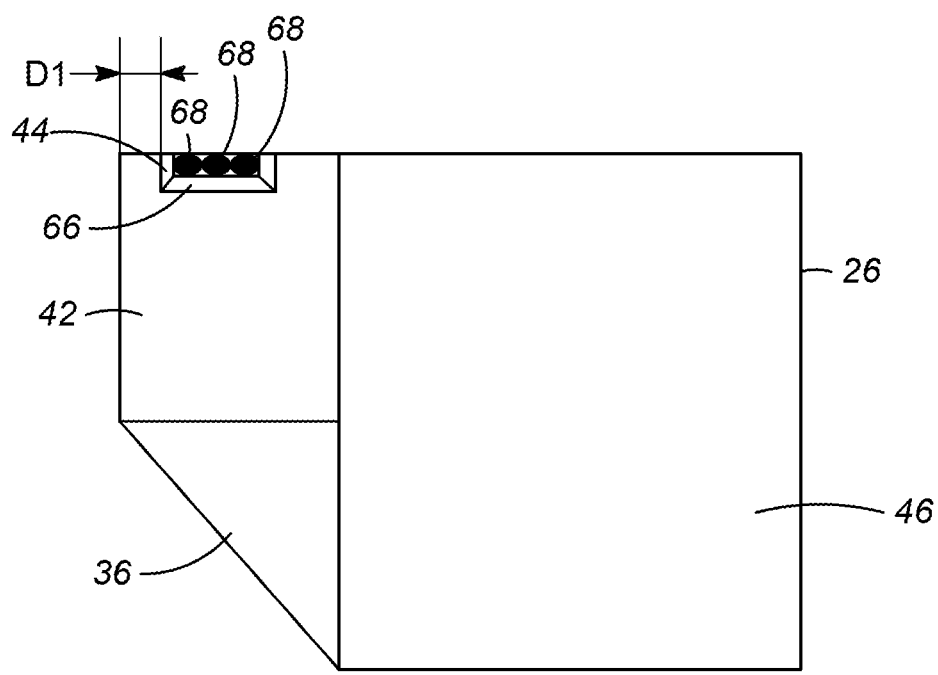

Details of an exemplary configuration of the HX and PE control units 50, 56, are illustrated in FIGS. 13 and 14. Performance modulation may be unnecessary as most of the time the power electronics 46 generates a stable amount of heat power at around 5 kW. Advantageously, it is simpler to run a constant fuel flow through the container 26. Regarding the heat exchanger 42, the main limitations and failure cases to be avoided are related to fuel temperature limitations (e.g., predetermined maximum temperature in any location, 45-50° C. for instance), fuel flow at the container input, irregular fuel supply to the APU (e.g., the fuel being tapped off of the APU).

In one embodiment, various sensors measure temperature at the input and output of the heat exchanger 42; mass flow; flow pressure; temperature in the power electronics compartment 46; pump status; and valve status. In addition, power electronics malfunction information may be received from the payload control electronics 46. Ambient cargo hold temperature data may be received from the aircraft environmental control system. By comparison to internally stored limit values regarding these data and/or their trends, the inlet valve can be closed and the pump can be shut off as required.

Status information can be sent to cockpit warning and display systems for the pilots and/or crew members, and similar information can also be sent to the maintenance system for troubleshooting purposes. To keep the system simple, no further exchanges with aircraft systems may be included. Built-in test equipment (BITE) procedure can be provided to test the controls, pumps, valves, and the like, after installation, as they have potential safety impacts. This BITE may be short and concise to avoid prolonging the installation procedures.

The electronic cards of the control panel 44 may be installed on the top part of one of the wings 36 of the container 26. The data connections can be installed with the service power (e.g., 28 V DC, 115 V AC) on the top side of the container 26 near the front face, but preferably spaced a predetermined distance D1 (e.g., approximately 10 cm) from the side, at the end of a slanted plane 66 facing slightly downwards. Connectors 68 are thus disposed offset from an edge of the container 26 in an easily accessible position, while avoiding having electrical wires hanging in front of the container 26 (e.g., risk of damage while manipulating other cargo in the neighboring space), and allowing condensation water to flow away from the connectors to avoid short-circuits. For further protection, a small metallic offshoot 70 above the connectors 68 may serve as an umbrella to prevent water falling directly on them.

Figure 15:
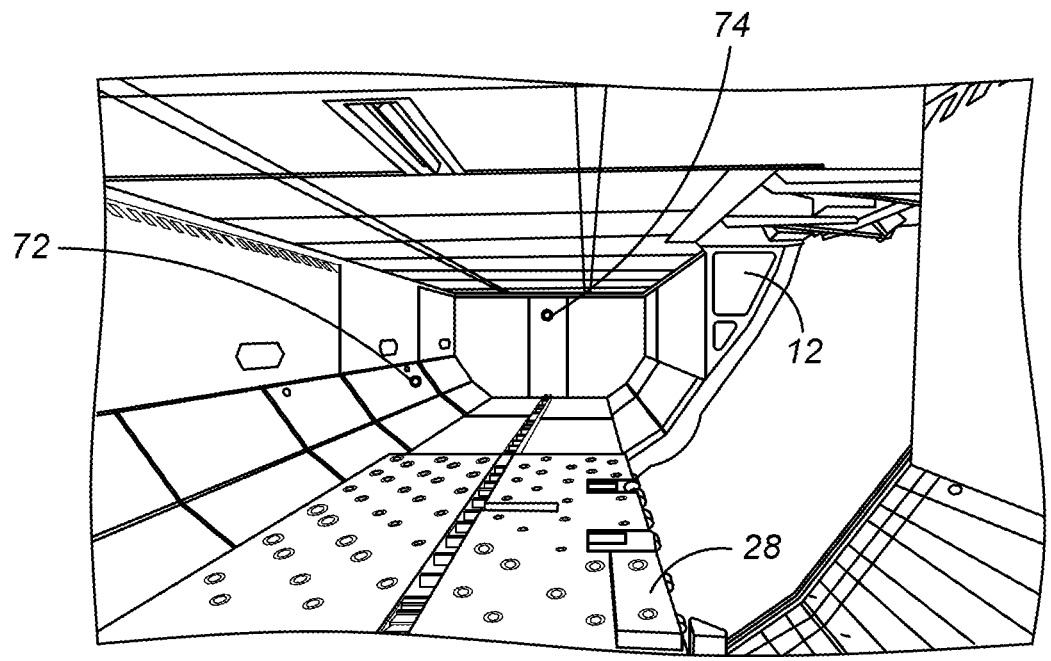
FIGS. 15 and 16 illustrate an exemplary installation process of the container in a cargo bay of the aircraft.
Figure 16:
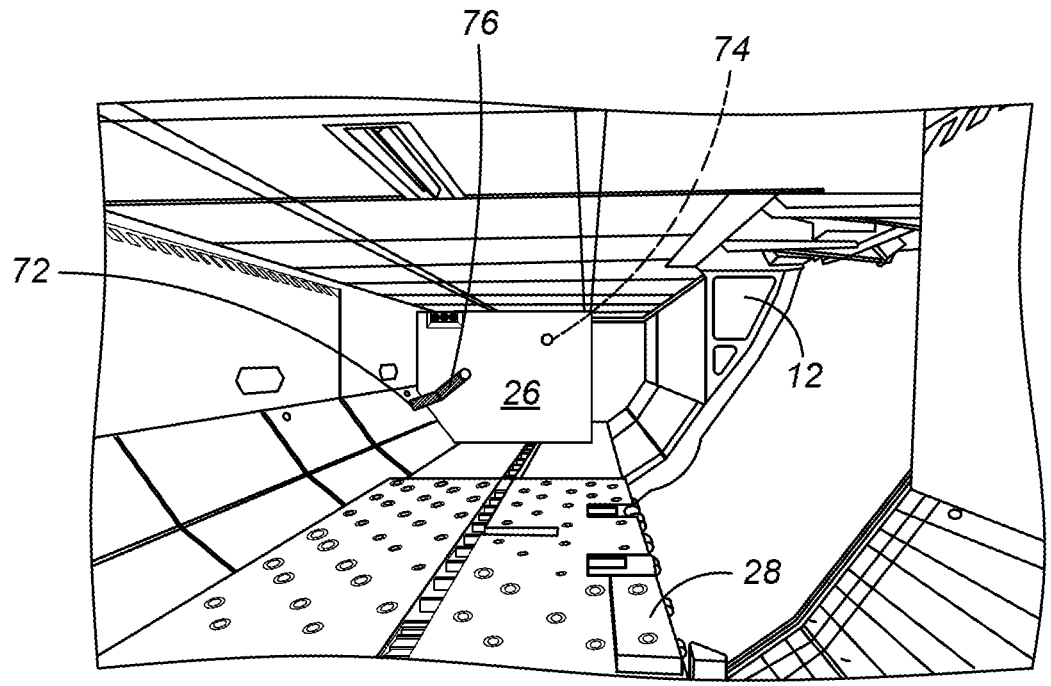

Referring now to FIGS. 15 and 16, an exemplary cargo layout with lining for installation of the container 26 is shown in FIG. 15. A first fuel interface 72 to the APU fuel line on the left side is provided, and a second fuel interface 74 to the Additional Center Tank (ACT) line on the far wall is provided, as seen from the aft section of the aft cargo hold, looking forward. Further, the container 26 is installed with one or more fuel lines 76 connected to the first fuel interface 72 is shown in FIG. 16. The second fuel interface 74 as a warm fuel outlet is shown hidden on far side of the container 26, as seen from the aft section of the aft cargo hold, looking forward.

Figure 17:
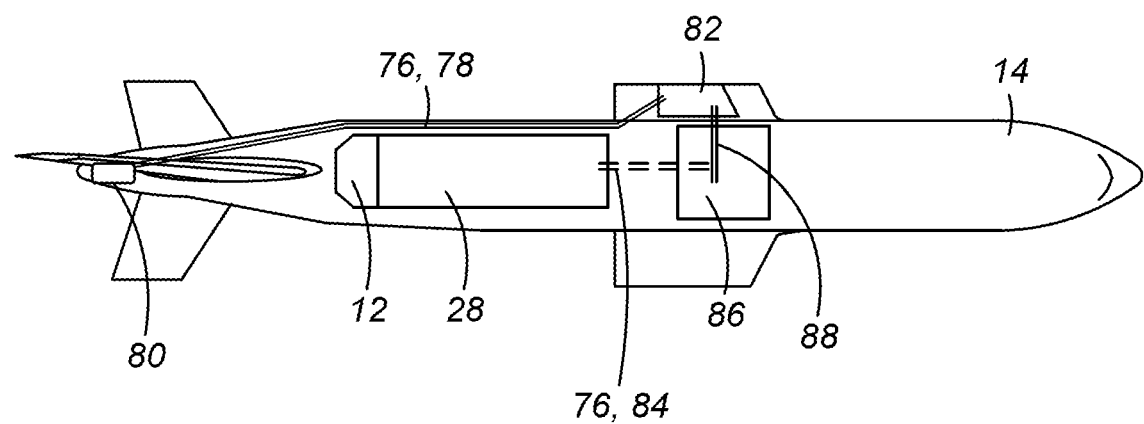
FIGS. 17 and 18 illustrate an exemplary fuel pipe line installation process of the container in the cargo bay of the aircraft.
Figure 18:
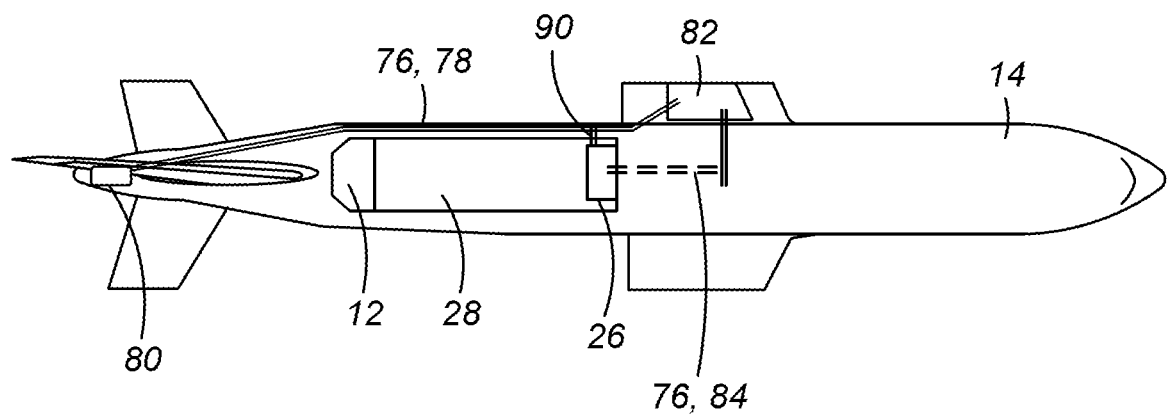

Referring now to FIGS. 17 and 18, an exemplary connection arrangement of the container 26 to a fuel network of the aircraft 14 is shown. A current fuel system layout in the aircraft 14 is schematically represented in FIG. 17, which includes the fuel pipes 76 that can be installed as an option, and therefore for which space is available and all bracket needs are known and designed for, and safety studies are available.

As an example, cool fuel can be bled off a first APU fuel line 78, running along the aft cargo compartment just behind the lining. As an APU 80 is running to provide electrical power to the power electronics 46, there will be fuel flowing in the first APU fuel pipe 78. Cold fuel is coming from a left wing inner tank 82, using a standard APU fuel installation. A separate second fuel line 84 is connected from the container 26 to the left wing inner tank 82 to deliver warm or heated fuel via an ACT 86 and/or a refuel gallery 88.

The first APU fuel pipe 78 is cut to install a new derivation pipe 90. A one meter-long pipe sufficient to reach the container 26. A cargo lining is replaced to allow passage of the derivation pipe 90. This is an air-tight fire-proof lining for safety reasons, but such provisions for fuel pipes exist for additional cargo tank installation. The warm fuel output is sent back to the fuel tanks 82, 86 via a pipe which can be installed as part of the ACT option. As such, this configuration saves installation costs and operational expenses. Due to the ACT option, it is known that connecting and disconnecting fuel pipes to the container 26 can be done rapidly with conventional bolts and O-rings as known in the art.

Typically, fuel is delivered to the center tank 86 to be stored, but the warm fuel cannot be sent to the center tank, for a number of reasons. First, the center tank 86 is often empty in targeted missions, and warm fuel in an empty volume of air is undesirable. Even with an inerting system available on some aircraft, delivering warm fuel into the empty tank must be avoided. Second, taking fuel from the wing tank 82 and sending it back to the center tank 86 creates an imbalance in the aircraft 14. Third, other warnings can be triggered by fuel management logics.

To solve these problems, the ACTs 86 are refueled from the refuel gallery 88 which also provides fuel to the wing tanks 82. By reverting the flow out of the ACT fuel pipes 76, 84, and into the refuel gallery 88, the warm fuel can reach the wing tank 82. This exemplary configuration is illustrated in FIG. 18. In this example, the only two completely new items are the container 26, and the derivation pipe 90 connected to the first APU fuel line 78.

In a preferred embodiment, a preliminary sizing for a necessary fuel mass flow (e.g., in kg/min) may be defined as provided by expression (1):

$$\dot{m} = 60 \times \frac{P_{heat}}{C_{P_{fuel}} \cdot \Delta T} \qquad (1)$$

considering a conservative target of a 30° C. temperature rise in the fuel, to keep some margins from safety limits on hot days, local heating effects and power variations, and considering a constant 5 kW heat load, and with a Jet-A specific heat of 2 kJ/(kg K), the resulting fuel flow is approximately 5 kg/min.

As for pressure drop, an exemplary fuel circuit for the container 26 begins in the wing tank 82, goes back to the aft cargo compartment, turns around and flows through the container, then back towards the center tank 86 and into the wing tank. For example, this should represent approximately 15 meters of pipe length.

The pipes 76, 78, 84 are considered to be circular and have, e.g., a 0.5" diameter for a typical installation. Other suitable diameters and pipe shapes are contemplated depending on pipe installation constraints (e.g., available space, segregation rules, and the like). Supposing bend radii are sufficiently high to disregard related losses at this point, and considering the above flow, the pressure drop in the piping may be approximately 35 psi. This configuration allows selection of an appropriate fuel pump with performance margins.

Another important aspect of the present invention is rapid installation and removal processes. Provided that the aircraft 14 is provisioned with the APU fuel line derivation 90 and the fuel pipes 76, 84, only few rapid actions are involved to install the present invention.

These actions include bringing the container 26 in position and locking it down in place, using the standard provisions of the cargo hold. It is simpler to install the present invention if a cargo-loading system is installed, and no more difficult than loading a heavy box of freight for manual operations. Other steps include bringing in a fuel input line (e.g., one meter) and connecting it to the derivation 90 on one side, and to the container 26 on the other side. A fuel output line (e.g., one meter) is connected to the container 26 on one side, and to the ACT fuel pipe 76, 84 on the other side. Then, the electrical connections 68 are made to the container 26, and a BITE (built-in test equipment) test is performed. Similarly, the removal process is easy, as it is the reverse of the above, without the BITE test.

As discussed above, the present invention provides several advantages. Initially, the power electronics 46 can be run in a favorable environment (e.g. temperature, humidity, pressure). Second, the power electronics 46 can be quickly removed to gain weight when the electric taxiing system is not needed. Further, maintenance operations are easy, as there is direct access to electric components of the power electronics 46, in a single location (e.g., the container 26), and if all else fails, the entire container can be taken out to a lab for maintenance.

Also, sufficient cooling is provided to the power electronics 46, and the heat is then naturally transferred into the atmosphere with no further effort. Cooling efficiency is high, and generated noise is low. The installation design is reduced to minimal, as only the new derivation point 90 on the APU fuel line 76, 78 is already available, except for the short derivation line 90. This configuration is advantageous when compared to the previous solution which required modifications in the entire rear fuselage, with sophisticated bracketing needs, new types of power lines, and a complicated duct system.

In the present invention, there is minimal risk of physical clashes due to unknown aircraft system configurations. Hardly any installation or modification effort is required during aircraft assembly, and a retrofit installation is significantly simplified. The present invention remains simple, and thus reduces risks of design and maintenance issues. Further, an overall weight of the container 26 is lower than conventional electric equipment.

In one embodiment, a higher-rated APU fuel pump may be used in the container 26 to supplement an existing APU pump which pushes fuel into the APU line. The standard pump is voluntarily low-rated, as its main requirement is to be started on battery power alone. Using new pump and/or battery technologies, a more powerful pump can be installed while still complying with the requirements. This is supposing such a pump has the same physical aspect as the existing pump. In this case, the container pump and the associated controls can be removed.

Another solution to the same problem is to switch on a left engine fuel pump to help push fuel into the APU line 76, 78. However, this pump may have high power consumption, which may be incompatible with an existing electric taxiing system. In this case, the container pump and the associated controls can be removed.

As mentioned above, existing cargo ventilation options for air cooling can be used to remove the heat from the cargo space. But, this involves heavier modifications to the aircraft 14. In this case the fuel heat exchanger 42 can be replaced by a large fan in the container 26, and the fuel input and output interfaces can be removed, as are the associated safety issues and the resulting BITE test. Thus, the installation and removal are even easier in this configuration. However, this may create elevated temperatures in the cargo hold, especially if large volumes of cargo are also carried in the hold.

While at least one exemplary embodiment of the present invention has been shown and described, it should be understood that modifications, substitutions and alternatives may be apparent to one of ordinary skill in the art and can be made without departing from the scope of the invention described herein. This application is intended to cover any adaptations or variations of the specific embodiments discussed herein. In addition, in this application, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

What is claimed is:

1. A container designed for carrying payload and being removably installable and dimensioned to fit in a cargo bay of an aircraft, the container comprising:
    a payload compartment having space defined by the payload compartment for carrying the payload;
    a heat exchanger installed within the container to perform a heat exchange operation for the payload using a coolant;
    a heat exchanger control unit that controls the heat exchange operation of the heat exchanger between the payload and the heat exchanger using an internal fluid circuitry;
    an external interface providing connections between the aircraft and the container, the external interface including a power input and a coolant intake conduit and a coolant output conduit that provide coolant delivery to and from the container; and
    a pump within the container, the pump generating a predetermined coolant flow in the container, and connected to an input valve that controls the predetermined coolant flow of the container, wherein the heat exchanger is enclosed in an air-tight compartment to prevent leakage from the heat exchanger, wherein the heat exchanger receives the coolant from a wing fuel tank via a first fuel line, one end of the first fuel line connected to an aircraft Auxiliary Power Unit (APU) and an opposite end of the first fuel line connected to the wing fuel tank, wherein the heat exchanger delivers the coolant from the container to the wing fuel tank via a second fuel line, one end of the second fuel line connected to the container and an opposite end of the second fuel line connected to a refuel gallery which is connected to the wing fuel tank.

2. The container of claim 1, wherein at least one lateral wing is constructed and arranged for the container, and the at least one lateral wing is capable of fitting within a generally round cross-sectional shape of a fuselage of the aircraft.

3. The container of claim 1, wherein the heat exchanger control unit is configured to specify an amount of heat to exchange between the payload and the heat exchanger.

4. The container of claim 1, further comprising a power electric control unit that controls an electric component of the payload via at least one input connection and at least one output connection of the power electric control unit.

5. The container of claim 1, wherein a performance of the heat exchanger is adapted over a predetermined time period based on a feedback information from at least one sensor associated with the container.

6. The container of claim 1, wherein the coolant includes at least one of: air, fuel, hydraulic fluid, water, and cooling solution.

7. The container of claim 1, wherein the heat exchanger includes at least one conductive plate to remove heat from the payload.

8. The container of claim 1, wherein one end of a derivation pipe is connected the first fuel line and an opposite end of the derivation pipe is connected to the container.

9. The container of claim 1, further comprising at least one electric connector disposed on an outer surface of the container to provide an electric connection between the container and the aircraft.

10. The container of claim 9, wherein the at least one electric connector is disposed offset from an edge of the container for allowing condensation water to flow away from the at least one electric connector.

11. The container of claim 9, wherein an offshoot is disposed near the at least one electric connector for preventing the condensation water from falling directly on the at least one connector.

12. The container of claim 9, wherein the at least one electric connector has a slanted plane facing slightly downwards for allowing the condensation water to flow away from the at least one electric connector.

13. A container designed for carrying payload and being removably installable and dimensioned to fit in a cargo bay of an aircraft, the container comprising:
- a payload compartment having space defined by the payload compartment for carrying the payload;
- a power electric control unit that controls an electric component of the payload via at least one input connection and at least one output connection;
- a heat exchanger installed within the container to perform heat exchange operation for the payload using a coolant, wherein the heat exchanger is enclosed in an air-tight compartment to prevent leakage from the heat exchanger;
- a heat exchanger control unit that controls the heat exchange operation of the heat exchanger between the payload and the heat exchanger using an internal circuitry;
- an external interface providing connections between the aircraft and the container, the external interface including a power input and a coolant intake conduit and a coolant output conduit that provide coolant delivery to and from the container; and
- a pump within the container, the pump generating a predetermined coolant flow in the container, and connected to an input valve that controls the predetermined coolant flow of the container, wherein the heat exchanger receives the coolant from a wing fuel tank via a first fuel line, one end of the first fuel line connected to an aircraft Auxiliary Power Unit (APU) and an opposite end of the first fuel line connected to the wing fuel tank, wherein the heat exchanger delivers the coolant from the container to the wing fuel tank via a second fuel line, one end of the second fuel line connected to the container and an opposite end of the second fuel line connected to a refuel gallery which is connected to the wing fuel tank.

14. A container designed for carrying payload and being removably installable and dimensioned to fit in a cargo bay of an aircraft, the container comprising:
- a payload compartment having space defined by the payload compartment for carrying the payload;
- a power electric control unit that controls an electric component of the payload via at least one input connection and at least one output connection;
- a heat exchanger installed within the container to perform heat exchange operation for the payload using a coolant;
- a heat exchanger control unit that controls the heat exchange operation of the heat exchanger between the payload and the heat exchanger using an internal conduit, wherein the internal conduit is connected at one end to the payload compartment, and an opposite end to the heat exchanger for exchanging heat between the heat exchanger and the payload, wherein the heat exchanger is enclosed in an air-tight compartment to prevent leakage from the heat exchanger;
- an external interface providing connections between the aircraft and the container, the external interface including a power input and a coolant intake conduit and a coolant output conduit that provide coolant delivery to and from the container; and
- a pump within the container, the pump generating a predetermined coolant flow in the container, and connected to an input valve that controls the predetermined coolant flow of the container, wherein the heat exchanger receives the coolant from a wing fuel tank via a first fuel line, one end of the first fuel line connected to an aircraft Auxiliary Power Unit (APU) and an opposite end of the first fuel line connected to the wing fuel tank, wherein the heat exchanger delivers the coolant from the container to the wing fuel tank via a second fuel line, one end of the second fuel line connected to the container and an opposite end of the second fuel line connected to a refuel gallery which is connected to the wing fuel tank.

15. The container of claim 1, wherein the air-tight compartment prevents vapors from egressing and sparks from reaching an aircraft fuel within the compartment.

* * * * *